United States Patent [19]

Buckley et al.

[11] Patent Number: 4,752,825
[45] Date of Patent: Jun. 21, 1988

[54] VIDEO DISPLAY SIMULATOR AND ANALYZER

[75] Inventors: Robert M. Buckley, Medford; Joseph Lovrecich, Plainview; William R. Biagiotti, Coram, all of N.Y.

[73] Assignee: Grumman Aerospace Corporation, Bethpage, N.Y.

[21] Appl. No.: 917,742

[22] Filed: Oct. 10, 1986

[51] Int. Cl.[4] .......................................... H04N 17/04
[52] U.S. Cl. .............................. 358/139; 324/73 AT; 324/404
[58] Field of Search .................. 358/139, 10; 324/404, 324/73 AT

[56] References Cited

U.S. PATENT DOCUMENTS

| | | | |
|---|---|---|---|
| 2,751,429 | 6/1956 | Schlesinger | 358/10 |
| 2,995,666 | 8/1961 | Wood . | |
| 3,019,289 | 1/1962 | Machlis | 358/10 |
| 3,337,684 | 8/1967 | Sadler | 358/139 |
| 3,582,544 | 6/1971 | Wlasuk | 358/10 |
| 3,586,755 | 6/1971 | Wlasuk | 358/10 |
| 3,590,149 | 6/1971 | Harshberger | 358/139 |
| 3,757,040 | 9/1973 | Bennett et al. | 358/87 |
| 3,879,749 | 4/1975 | Baum | 358/10 |
| 3,958,269 | 5/1976 | Davis | 358/10 |
| 4,023,110 | 5/1977 | Oliver | 328/109 |
| 4,026,555 | 5/1977 | Kirschner et al. | 358/903 |
| 4,058,826 | 11/1977 | Schneider | 358/10 |
| 4,072,851 | 2/1978 | Rose | 364/487 |
| 4,093,960 | 6/1978 | Estes | 358/10 |
| 4,104,725 | 8/1978 | Rose et al. | 364/487 |
| 4,149,178 | 4/1979 | Estes | 358/10 |
| 4,228,432 | 10/1980 | Osborne | 340/736 |
| 4,262,302 | 4/1981 | Sexton | 358/10 |
| 4,303,938 | 12/1981 | Berke et al. | 358/139 |
| 4,364,080 | 12/1982 | Vidovic | 358/10 |
| 4,466,014 | 8/1984 | Wilensky et al. | 358/10 |
| 4,482,861 | 11/1984 | Jalovec et al. | 324/77 B |
| 4,495,519 | 1/1985 | Wahlquist | 358/139 |
| 4,541,066 | 9/1985 | Lewandowski | 324/73 AT |
| 4,568,975 | 2/1986 | Harshbarger | 324/404 |
| 4,602,272 | 7/1986 | Duschl | 324/404 |
| 4,670,782 | 6/1987 | Harshbarger | 358/139 |

FOREIGN PATENT DOCUMENTS 89871  9/1983  European Pat. Off. .

OTHER PUBLICATIONS

International Conference on TV Measurement, London 21-23, May 1979, pp. 197-204 "A Microprocessor-Based Video Analyzer", Crosby, et al.

Primary Examiner—Howard W. Britton
Attorney, Agent, or Firm—Pollock, VandeSande & Priddy

[57] ABSTRACT

The display simulator analyzer is a fully integrated processor controlled instrument used for testing video display devices. The test signals may be generated by a video function generator, a high resolution graphics generator, a modulator or combinations thereof. As the name implies, the simulator-analyzer also measures and analyzes parameters generated from an euipment under test by means of its analyzer, which has incorporated therein a counter-timer, a real time digitizer and a sync stripper.

13 Claims, 5 Drawing Sheets

RADIAL SCAN

SPIRAL SCAN,
CLOCKWISE
OUTWARDS

SECTOR SCAN
OUTWARDS,
ALTERNATE FIELD

RECTILINEAR
SCAN

VARIOUS SCAN
MODES

VIDEO DISPLAY SIMULATOR AND ANALYZER

FIELD OF THE INVENTION

The present invention relates to automatic testing instruments and more particularly to a video display simulator and analyzer.

BRIEF DESCRIPTION OF THE PRIOR ART

Conventionally, when it is desired to test a radar display in, for example, an aircraft, sundry instruments are required. To illustrate, a function generator may be needed to impose on the screen of the video display certain patterns. And while these patterns are being displayed, a separate instrument, for instance, an oscilloscope, is needed to measure the displayed patterns. It is only after the patterns have been measured that calculations, utilizing some sort of calculating device, may be performed on these measured patterns. Since the number of patterns which are needed to analyze a particular video display system may be large, a great number of test instruments may be required. In any event, because of the large number of connections and the many reconfigurations required of the many test instruments, the conventional method of sending in simulation patterns to a video display and then analyzing these simulated patterns becomes extremely cumbersome.

SUMMARY OF THE INVENTION

In accordance with the present invention apparatus, a video display system can be both simulated and analyzed by a single instrument. This combined video display simulator and analyzer is a fully integrated, processor controlled, automatic test instrument which has, besides the processor controller, three major components. The first major component comprises a video function generator, oftentimes working in conjunction with a two-channel modulator. This video function generator is capable of generating both radar and sonar simulations for the equipment under test. A second major component of the present invention system is a high resolution graphics generator, which is capable of generating a number of video patterns for the equipment under test. The high resolution graphics generator and the video function generator can work in tandem for generating a composite signal to be fed to the equipment under test. The third major component of the present invention is an analyzer, which is used to receive signals outputted from the equipment under test. Upon receiving these signals, the analyzer would perform a myriad of analyses, thereby obtaining information for determining whether or not the equipment under test is operating properly. The first and second major components of the system and the analyzer may work independently of each other, as well as in conjunction with each other.

By utilizing the present invention combination simulator and analyzer, the following advantages are realized:

1. All of the functions which are needed to test a video display system are combined into a single instrument;

2. Because of the use of a central processing unit, the operations of the different components proceed quickly and efficiently; and 3. There are reductions in the size, the number and the weight of the instruments needed because of the modularity of the system.

The above-mentioned objects and advantages of the present invention will become more apparent and the invention itself will be best understood by reference to the following description of an embodiment of the invention taken in conjunction with the accompanying drawings, wherein:

DETAILED DESCRIPTION OF THE PRESENT INVENTION

Figure 1:
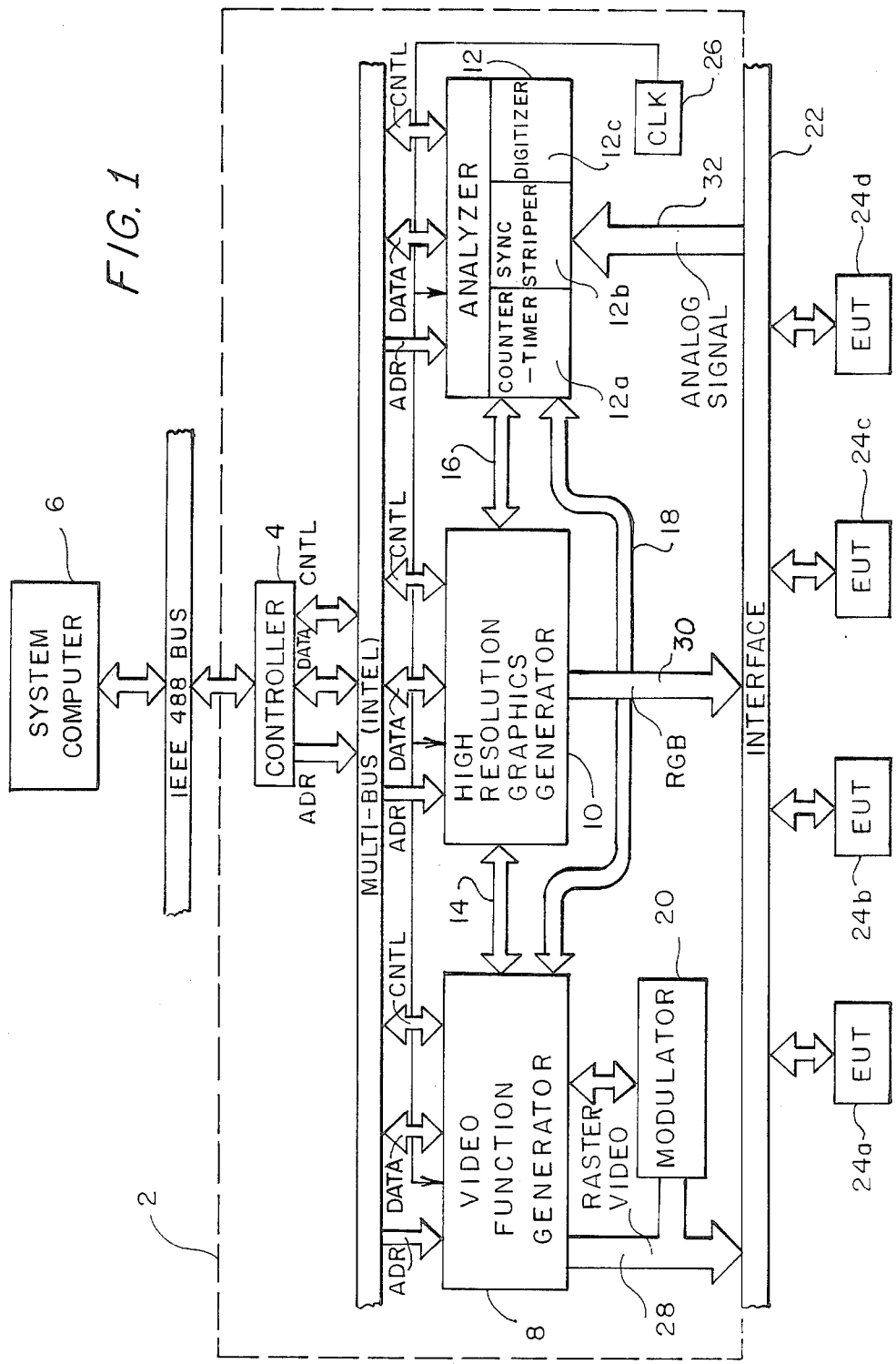
FIG. 1 is a block diagram illustrating the simulator-analyzer of the present invention.

An embodiment of the present invention is presented in FIG. 1. As shown, the display simulator-analyzer is designated 2 and is enclosed inside the rectangular dotted box. Within display simulator-analyzer 2 is controller 4, which has a bi-directional port connected to an IEEE 488 bus. This allows controller 4 to communicate with system computer 6 which, likewise, is also connected to the IEEE 488 bus. System computer 6 may be used to control, besides simulator-analyzer 2, many other test instruments in an automatic test equipment system. For this embodiment, controller 4, which is an Intel 8086 chip, is connected to an Intel multi-bus. For the sake of simplicity, memories such as 64K PROMS and 128K RAMS are not shown in FIG. 1, as the use of these memories for an Intel 8086 chip is well known.

Also connected to the Intel multi-bus are a video function generator 8, a high resolution graphics generator 10 and an analyzer 12. Both video function generator 8 and analyzer 12 are conventional components which should be well-axquainted by those skilled in the art. Each of these components is connected to the multi-bus by means of three data lines: an input address line, a bi-directional data line and a bi-directional control line. Video function generator 8 is further connected by means of a bus 14 to high resolution graphics generator 10 which, similarly, is connected to analyzer 12 by means of bi-directional bus 16. Analyzer 12 is also connected via bi-directional bus 18 to video function generator 8. Thus, all three major components in simulator-analyzer 2 are interconnected. Also connected to video function generator 8 by way of a bi-directional data bus is a two-channel modulator 20. Modulator 20 is further connected by means of a uni-directional bus 28 to interface 22, which also has connected thereto video function generator 8, graphics generator 10 and analyzer 12. Further connected to interface 22 is a plurality of equipment under test 24A to 24D.

Focusing on the simulator portion of simulator-analyzer 2, attention is directed to video function generator 8, high resolution graphics generator 10 and modulator 20—which are required for various forms of video generation. It should be noted that the combination of video function generator 8, modulator 20 and high resolution graphics generator 10 has the capability to create video signals for various video displays, including both radar and sonar systems. These three components can, individually or in combination, generate: (1) composite video signals (color); (2) composite video signals (black and white); (3) composite video signals with equalizing and broad pulses; (4) scan video signals; (5) stroke video signals; and (6) mixed video signals.

Figure 2:
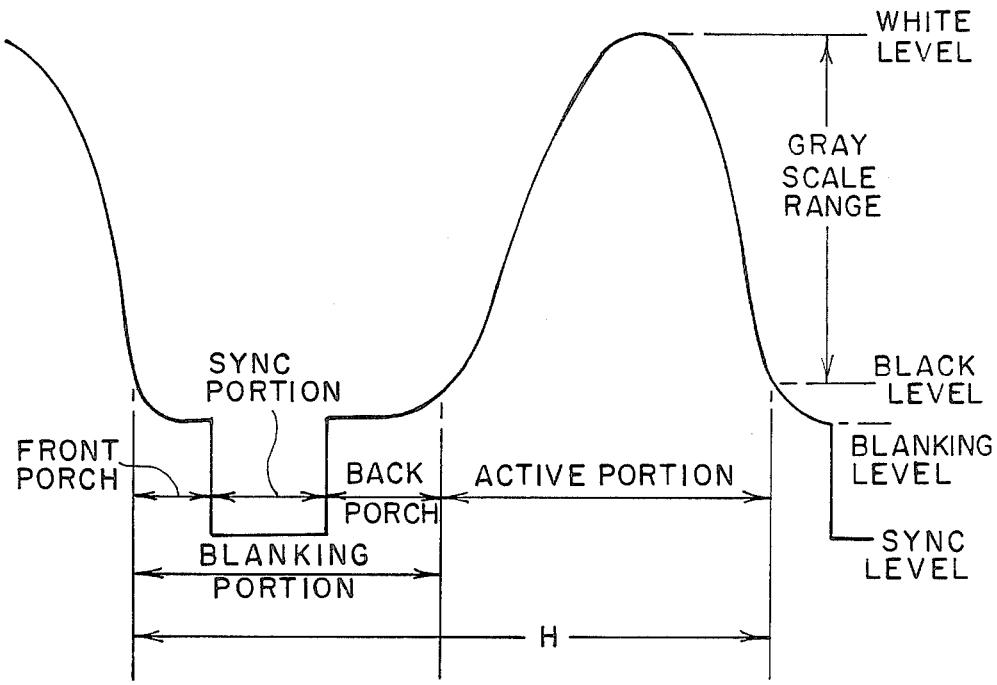
FIG. 2 is a drawing showing the horizontal sweep and period of a video waveform.

Regressing now for a moment to the aforesaid different types of signals, it should be noted that a composite video signal (both color and black and white) is a signal that contains, but for the RF carrier, all the information necessary to produce a television image and the synchronization of such image. In other words, a composite video signal includes a video waveform, a horizontal sync pulse, and a vertical sync pulse. See FIG. 2.

The video waveform generates an image on the monitor screen of the display system, for example—a radar system, by including all shades of gray, from pure black to pure white—for a black and white video signal. The horizontal sync pulse delimits the line sweep, i.e., the period of the signal, across the monitor, while the vertical sync pulse delimits the number of lines to be displayed on the monitor screen.

In the case of color video signals, it should be noted that a color video signal includes three separate video waveform outputs, that is, —red, green and blue, depicted as an RGB output. It is the green video waveform that contains the composite signal. As is well known, there is an active portion and a blanking portion to a composite video signal. The blanking portion of the composite video waveform for the horizontal or vertical syncs contains the Front Porch, sync pulse and the Back Porch.

Composite video signals with equalizing and broad pulses are expanded normal composite video signals which have, in addition to the normal composite video signal, the equalizing and broad pulses, also known as serration pulses. These pulses are required during the vertical retrace, e.g., the vertical blanking time for stabilizing the horizontal and vertical oscillators of the display monitor under test.

Scan video signals refer to video data created by raster scanning, modulated raster scanning, sweeping or modulated sweeping in a particular pattern such that a radar field of view is simulated and presented by means of a video display system.

Figure 4:
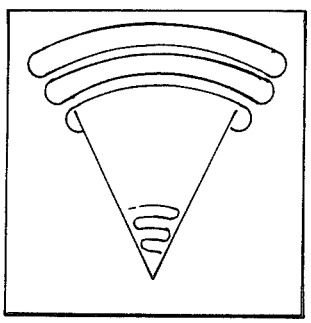
FIG. 4 illustrates the different types of scan simulation of the present invention simulator-analyzer.
Figure 4:
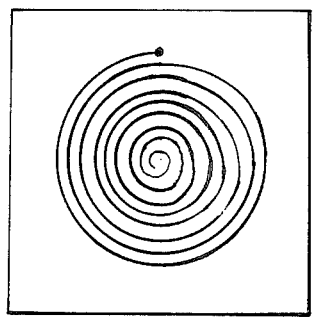
Figure 4:
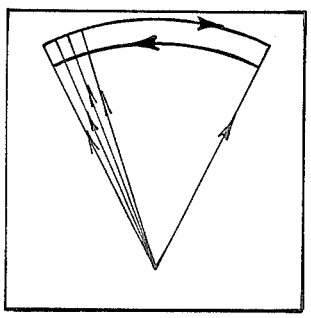
Figure 4:
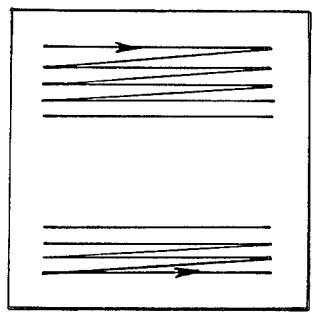

Simulator-analyzer 2 is capable of generating four different types of scan video signals, also referred to as scanning modes. These are radial, rectilinear, sector and spiral. See FIG. 4. Each of the scanning modes may be programmed for a particular field scan and line scan. For example, looking at FIG. 4, it can be seen that for the radial, spiral and sector scan modes, the direction of the field scan may be programmed for a clock wise or counterclock wise sweep, i.e., each line sweeps in the designated direction with the retrace blanked. Also, the radial, sector and spiral scan modes may be programmed for an alternate field scan. Too, the line scan may be programmed for inward or outward sweep. For instance, the line sweep for the radial and sector scan modes can start at the vortex (for outward sweep) or at the top of the field (for inward sweep). The spiral scan lines can start at the center of the screen (for outward sweep) or at the outer circumference (for inward sweep).

Focusing on the rectilinear scan mode, it can be seen that the rectilinear field may be swept from left to right or from right to left, with lines sweeping from top to bottom or from bottom to top of the screen. The retrace line, of course, is blanked. In addition, such a line scan can sweep in both directions.

Stroke video signals, also known as stroke mode scans, are generated by deflecting the horizontal (x-channel) and vertical (y-channel) deflection amplifiers, as well as activating a video gun (z-channel) intermittently for writing a particular symbology on a display screen in a random pattern.

The last type of video signals which may be generated by simulator-analyzer 2 are mixed video signals, which are composite video signals with provision for calligraphic writing—by using stroke video signals—during the vertical retrace, i.e., the blanking period.

Having described the types of video signals which may be generated by simulator-analyzer 2, attention is now directed to the respective components which made up the simulator portion of simulator-analyzer 2. Starting with high resolution graphics generator 10, it should be noted that this generator is made by Sky Computers, located in Massachusetts. Essentially, high resolution graphics generator 10 provides for a 40 MHz maximum video graphics generator which includes a graphic display control, a 1 mega-pixel by 16 contrast dynamic RAM, a color PROM, a lookup table, a video digital to analog converter and a 4 bit digital to analog converter, and gain amplifiers. Upon receiving instructions from controller 4, high resolution graphics generator 10 generates a set of user defined video patterns, in accordance with the conventional RS 170 standard, for the composite video modes of operation. To be discussed in more detail hereinbelow, high resolution graphics generator 10 may be combined with video function generator 8 for generating mixed video simulations. As shown in FIG. 1, the signals generated by high resolution graphics generator 10 are fed to interface 22 by means of the RGB line 30.

Video function generator 8—upon receiving instructions from controller 4 via the address, data and control lines—can, by itself, generate the stroke video simulation. When operating with modulator 20, video function generator 8 can generate the scan mode simulations, i.e., radial, spiral, sector, and rectilinear. If there are required only simple video signals, video function generator 8 can act as an arbitrary function generator.

Figure 3:
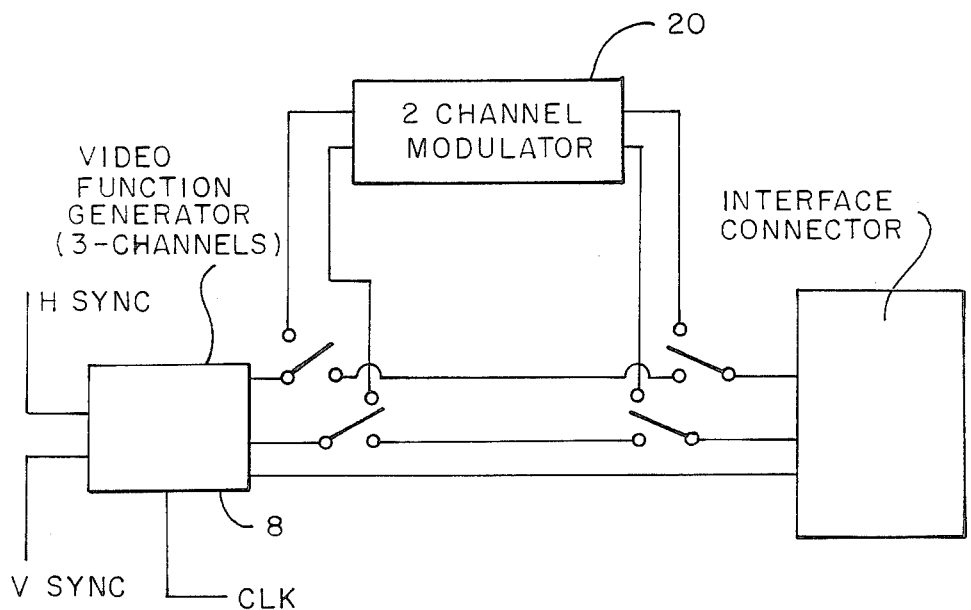
FIG. 3 is a more detailed block diagram showing the connection between the video function generator and a 2-channel modulator.

Video function generator 8 has three channels, each independently programmable for frequency, output source impedance, internal and external trigger capabilities. Two of these three channels may be internally modulated to emit user requirements by being coupled to modulator 20, which has two channels. Such a coupling is shown in FIG. 3.

Referring now to the measuring and analyzing aspects of the present invention simulator-analyzer, attention is directed to analyzer 12. As shown in FIG. 1, analyzer 12 includes a counter-timer 12A, a high speed digitizer 12C and a sync stripper 12B. Counter-timer 12A is a DC to 50 MHz device which can be used to measure the period, the frequency, rise-time, fall-time, time interval and time interval average of a signal. It can also be used to detect the horizontal and vertical sync periods directly through the use of sync stripper 12B, which is used to trigger the measurement from a preset video frame location. High-speed digitizer 12C is a 40 MHz real time sampler that can operate in pre-trigger, post-trigger and delay-trigger modes. In other words, the digitizer can digitize a portion of an analog display. The sync stripper can be used with the digitizer for locating a certain point—for digitizing—in a video frame. Therefore, analyzer 12 has the capability of locating a video pixel or groups of pixels in a video waveform.

In operation, under control of system computer 6, controller 4 sets the different components of simulator-analyzer 2 to a requested mode of operation—in terms of being a simulator or an analyzer. To activate the different components, controller 4 sends control signals, address signals and data signals to the respective components via the multi-bus. The control signals include write, read, I/O (input/output), write control and I/O read control signals. The first two signals are used for interfacing data with video function generator 8, modulator 20 and analyzer 12. The last two signals are used for interfacing data with high resolution graphics generator 10. Upon receiving the signals, video function generator 8 and high resolution graphics generator 10 would issue a data or acknowledge signal to controller 4, thereby freeing the latter to proceed to the next instruction.

The address signal contains 20 bits of data which are utilized by video function generator 8 and high resolution graphics generator 10. These address bits may be directly used to address memory banks (not shown), decoded for internal use by the respective components or used for inter-control between the components.

The data sent by controller 4 via the respective data buses may be stored in a RAM for sweep and video generations, or may be used to select internal clock frequencies, synchronization, input/output impedances, video output signal level and interface, attenuation for the video input signals and the addressing of the RAM.

Simulator-analyzer 2 operates on two basic clock frequencies, 80 and 100 MHz, which are provided by internal clock generator 26. Alternatively, an external clock source may be used for supplying a different clock frequency. As can be seen from FIG. 1, outputs 28 and 30 of video function generator 8 and high resolution graphics generator 10, respectively, are directly connected to interface 22 for subsequent connection to the equipment under test, such as 24A to 24D. Also note that the output from these equipment are connected directly via analog signal line 32 to analyzer 12. Although the simulator portion of simulator-analyzer 2 is independent of the analyzer portion thereof, it should be noted that for any video signal generation, analyzer 12 is not active. Conversely, where measurement and analyzing are taking place, modulator 20 and high resolution graphics generator 10 are inactive.

The present invention simulator-analyzer 2 is also capable of performing self-testing to ensure that all the output signals, i.e., composite video, stroke, and/or modulated video, are operational before use. This self-testing feature is achieved by routing signals generated from video function generator 8 and/or modulator 20 directly to analyzer 12 by means of bus 18. Likewise, signals generated from high resolution graphics generator 10 may also be directly fed to analyzer 12 by means of bus 16. Inside analyzer 12 are stored predetermined signals, to be used to compare with the inputted signals from respective function generator 8 and graphics generator 10. And if the inputted signals and the prestored signals do not correspond, a coded message is transmitted to controller 4, which subsequently transmits the same coded message to system computer 6 via the IEEE 488 bus. From this coded message, the station operator is notified as to which component within simulator-analyzer 2 is inoperative.

Figure 5:
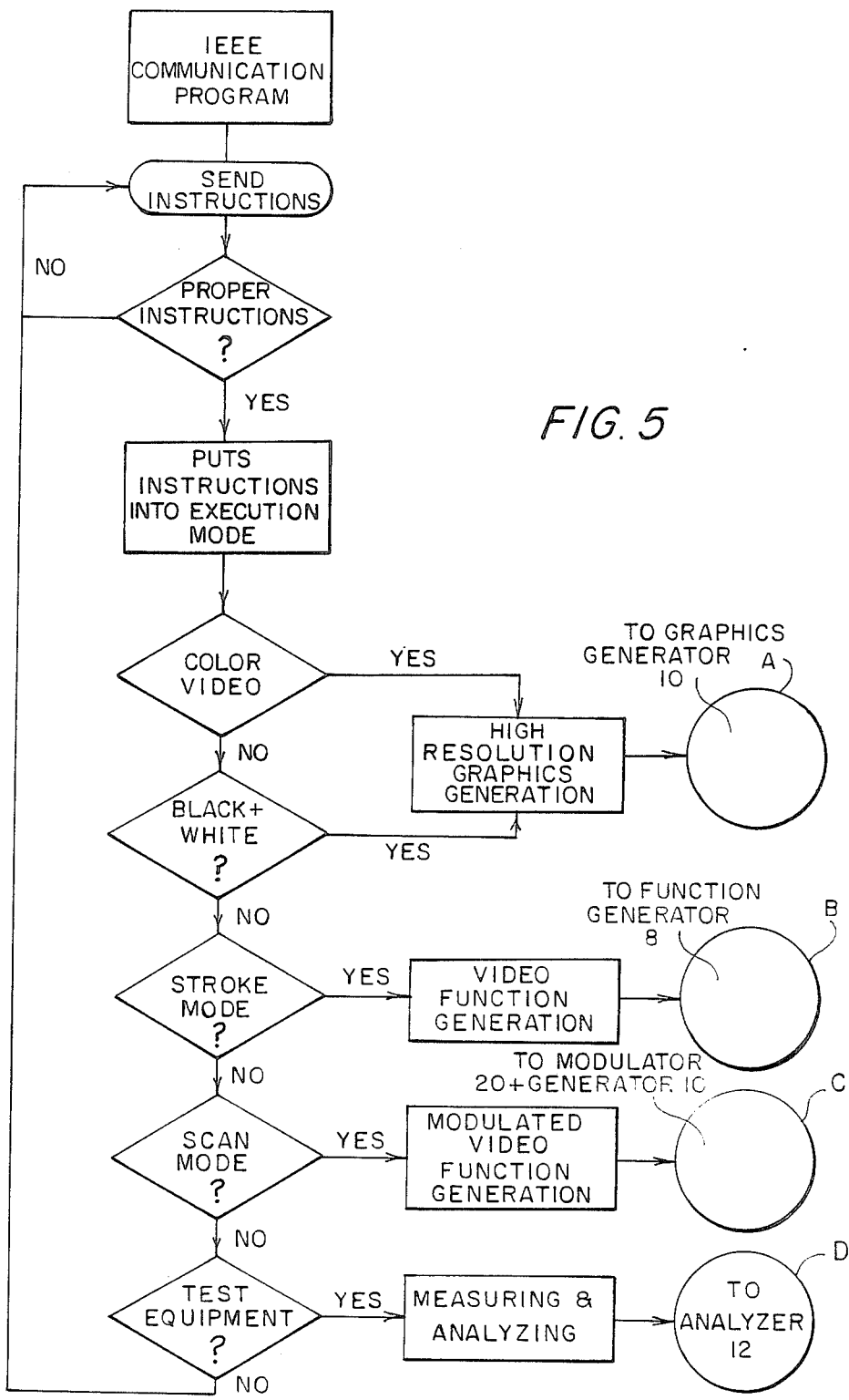
FIG. 5 is a flow chart showing the communication between the system computer and the present invention simulator-analyzer.

Referring now to FIG. 5, there is shown a subroutine flow chart illustrating the interaction between system computer 6 and the components within simulator-analyzer 2. The software language used for this system is Atlas, which is a language used in the defense industry. To communicate with simulator-analyzer 2, the system computer utilizes an IEEE communication program for communicating with controller 4. As shown in FIG. 5, instructions from the system computer are checked to see if they are proper. If affirmative, then they are put into the execution mode. From there, the instructions are routed to the different components of simulator-analyzer 2. For example, were a stroke video signal (stroke mode scan) desired, instructions would be sent to video function generator 8 for generating a stroke video signal.

Figure 6:
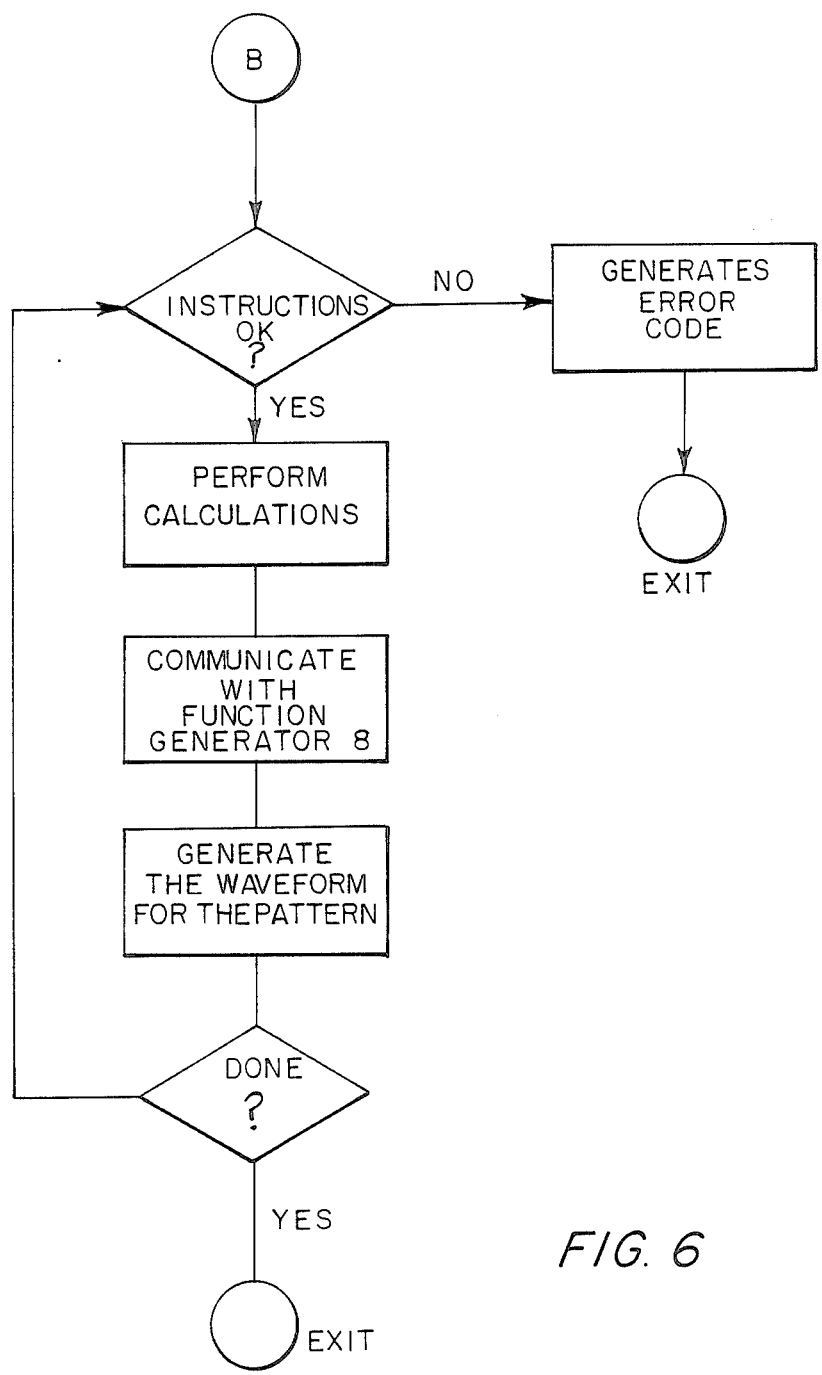
FIG. 6 is a sample flow chart showing the generation of a typical simulation.

FIG. 6 illustrates a flow chart demonstrating the generation of a stroke mode signal. As shown, the instructions for generating such a signal are first checked. If the instructions are invalid, an error code is generated and the process is stopped. If the instructions are valid, calculations which are needed for generating the stroke mode signal are then performed. For example, it may be necessary to divide the frequency of clock generator 26 to obtain a stroke "rate" frequency. The results from the calculations are next forwarded to function generator 8, from whence required patterns are generated. Upon completion, a "complete" signal is sent back to controller 4.

Having described an embodiment of the present invention, it should be understood that inasmuch as the present invention is subject to many variations, modifications and changes in detail, it is intended that all matters described throughout the specification and shown in the accompanying drawings be interpreted as illustrative and not in a limiting sense. Accordingly, it is intended that the invention be limited only by the spirit and scope of the appended claims.

We claim:

1. In an apparatus for generating signals to test an equipment and for measuring parameters generated by the equipment, the apparatus comprising:
  means for interfacing with the equipment;
  a controller means connected to a bi-directional multi-bus line;
  means for generating high resolution graphics connected to the multi-bus line and the interfacing means, the graphics generating means communicating with the controller means for feeding generated graphics to the equipment;
  means for generating video functions connected to the multi-bus line and the interfacing means, the video function generating means communicating with the controller means for feeding generated video simulations to the equipment; and
  means for measuring and analyzing parameters generated by the equipment, the measuring and analyzing means having bi-directional ports connected to the multi-bus and the interfacing means, respectively, the measuring and analyzing means communicating with the controller means for deciphering the measured parameters;

whereby the measured parameters are used to ascertain the operational status of the equipment.

2. Apparatus according to claim 1, wherein the video function generating means comprises a 3-channel arbitrary function generator, the video function generating means generating a stroke mode simulation.

3. Apparatus according to claim 1, wherein the generated graphics from the graphic generating means comprise a plurality of video patterns.

4. Apparatus according to claim 1, wherein the graphics generating means communicates with the video function generating means for producing mixed video patterns and simulations.

5. Apparatus according to claim 1, wherein the measuring and analyzing means comprises:
- a counter-timer and a high speed real time digitizer, the counter-timer and the digitizer being used for measuring the parameters generated by the equipment; and
- a sync stripper electrically connected to the counter-timer and the digitizer for locating a particular portion of a video simulation fed to the equipment.

6. Apparatus according to claim 1, wherein the graphics generating means and the video function generating means are individually connected to the measuring and analyzing means; and wherein the generated graphics and the generating video simulations are respectively sent to the measuring and analyzing means for comparing with corresponding pre-determined graphics and video simulations, differences resulting from the comparison signifying the malfunctioning of the apparatus.

7. Apparatus according to claim 1, further comprising:
- modulation means connected to the video function generating means, the modulation means working cooperatively with the video function generating means for generating scan mode simulations.

8. Apparatus according to claim 7, wherein the scan mode simulations comprise a sector scan, a spiral scan, a rectilinear scan and a radial scan.

9. A display simulator-analyzer, comprising:
- a controller connected via an external bus to a host processing means, the controller being activated by the host processing means, the controller further being connected to a bi-directional multi-bus;
- an interface bus for connecting an equipment to the display analyzer simulator;
- a graphics generator having a first bi-directional port connected to the multi-bus for communicating with the controller, the graphics generator further having a second port connected to the interface bus for feeding generated graphics to the equipment, the generated graphics including a plurality of video patterns;
- a video function generator having a first bi-directional port connected to the multi-bus for communicating with the controller and a second port connected to the interface bus for feeding generated video simulation to the equipment, the video function generator further communicating with the graphics generator for providing combined video patterns and simulations to the equipment; and
- an analyzer having a first bi-directional port connected to the multi-bus for communicating with the controller and a second port connected to the interface bus for receiving test parameters produced by the equipment, the parameters being used by the analyzer for determining the operational status of the equipment.

10. Display simulator analyzer according to claim 9, further comprising:
- a modulator connected to the video function generator, the modulator working cooperatively with the video function generator for generating scan mode simulations, the scan mode simulations including a sector scan, a spiral scan, a rectilinear scan and a radial scan.

11. Display simulator analyzer according to claim 9, wherein the video function generator generates a stroke mode simulation.

12. Display simulator analyzer according to claim 9, wherein the analyzer comprises:
- a counter-timer and a high speed real time digitizer, the counter-timer and the digitizer being used for measuring the parameters generated by the equipment; and
- a sync stripper electrically connected to the counter-timer and the digitizer for locating a particular portion of a video simulation fed to the equipment.

13. Display simulator analyzer according to claim 9, wherein the graphics generator and the video function generator are individually connected to the analyzer for sending respective generated graphics and video simulations to the analyzer, the analyzer comparing the graphics and simulations with corresponding prestored graphics and simulations, differences resulting from the comparison signifying the malfunctioning of the display simulator analyzer.

* * * * *

UNITED STATES PATENT AND TRADEMARK OFFICE
CERTIFICATE OF CORRECTION

PATENT NO. : 4,752,825

DATED : June 21, 1988

INVENTOR(S) : Robert M. Buckley, et al.

It is certified that error appears in the above-identified patent and that said Letters Patent is hereby corrected as shown below:

Column 2, line 48, change "axquainted" to --acquainted--.

Signed and Sealed this

Twenty-second Day of November, 1988

Attest:

DONALD J. QUIGG

*Attesting Officer*  *Commissioner of Patents and Trademarks*